United States Patent [19]

Miller

[11] Patent Number: 6,079,728
[45] Date of Patent: Jun. 27, 2000

[54] MOTORCYCLE HITCH

[76] Inventor: Hilburn Thomas Miller, 600 Paulson Dr., Las Vegas, Nev. 89123

[21] Appl. No.: 09/048,679

[22] Filed: Mar. 26, 1998

[51] Int. Cl.[7] ........................................... B60P 3/06
[52] U.S. Cl. .............................................. 280/402
[58] Field of Search ..................... 280/204, 292, 280/400, 402, 495, 497, 504, 511, 502; D12/114, 162; 403/122–144

[56] References Cited

U.S. PATENT DOCUMENTS

| | | | |
|---|---|---|---|
| D. 367,632 | 3/1996 | Grieve | D12/162 |
| 5,332,248 | 7/1994 | Higginbotham | 280/402 |
| 5,560,628 | 10/1996 | Horn | 280/402 |

*Primary Examiner*—Christopher P. Schwartz
*Assistant Examiner*—C. T. Bartz

[57] ABSTRACT

A new motorcycle hitch for attaching a trailer to a motorcycle. The inventive device includes spaced apart upper and lower rods each having a pair of elongate arms and an elongate crossbar extending between the arms. Each arm of the upper rod is positioned adjacent a corresponding arm of the lower rod. The invention includes a pair of mounting plates with one of the mounting plates coupled to one pair of adjacent corresponding arms of the upper and lower rods and another mounting plate coupled to another pair of adjacent corresponding arms of the upper and lower rods. An elongate crossbeam is extended between the arms of the lower rod. An elongate tubular receiving member is extended between the crossbars of the upper and lower rods. A hitch member is removably inserted through an opening in the back end of the receiving member into the lumen of the receiving member.

15 Claims, 2 Drawing Sheets

MOTORCYCLE HITCH

BACKGROUND OF THE INVENTION

1. Field of the Invention

The present invention relates to hitches for a motorcycle and more particularly pertains to a new motorcycle hitch for attaching a trailer to a motorcycle.

2. Description of the Prior Art

The use of hitches for a motorcycle is known in the prior art. More specifically, hitches for a motorcycle heretofore devised and utilized are known to consist basically of familiar, expected and obvious structural configurations, notwithstanding the myriad of designs encompassed by the crowded prior art which have been developed for the fulfillment of countless objectives and requirements.

Known prior art hitches for a motorcycle include U.S. Pat. No. 4,471,973; U.S. Pat. No. 4,588,199; U.S. Pat. No. 273,486; U.S. Pat. No. 5,004,133; U.S. Pat. No. 4,610,457; and U.S. Pat. No. 298,022.

While these devices fulfill their respective, particular objectives and requirements, the aforementioned patents do not disclose a new motorcycle hitch. The inventive device includes spaced apart upper and lower rods each having a pair of elongate arms and an elongate crossbar extending between the arms. Each arm of the upper rod is positioned adjacent a corresponding arm of the lower rod. The invention includes a pair of mounting plates with one of the mounting plates coupled to one pair of adjacent corresponding arms of the upper and lower rods and another mounting plate coupled to another pair of adjacent corresponding arms of the upper and lower rods. An elongate crossbeam is extended between the arms of the lower rod. An elongate tubular receiving member is extended between the crossbars of the upper and lower rods. A hitch member is removably inserted through an opening in the back end of the receiving member into the lumen of the receiving member.

In these respects, the motorcycle hitch according to the present invention substantially departs from the conventional concepts and designs of the prior art, and in so doing provides an apparatus primarily developed for the purpose of attaching a trailer to a motorcycle.

SUMMARY OF THE INVENTION

In view of the foregoing disadvantages inherent in the known types of hitches for a motorcycle now present in the prior art, the present invention provides a new motorcycle hitch construction wherein the same can be utilized for attaching a trailer to a motorcycle.

The general purpose of the present invention, which will be described subsequently in greater detail, is to provide a new motorcycle hitch apparatus and method which has many of the advantages of the hitches for a motorcycle mentioned heretofore and many novel features that result in a new motorcycle hitch which is not anticipated, rendered obvious, suggested, or even implied by any of the prior art hitches for a motorcycle, either alone or in any combination thereof.

To attain this, the present invention generally comprises spaced apart upper and lower rods each having a pair of elongate arms and an elongate crossbar extending between the arms. Each arm of the upper rod is positioned adjacent a corresponding arm of the lower rod. The invention includes a pair of mounting plates with one of the mounting plates coupled to one pair of adjacent corresponding arms of the upper and lower rods and another mounting plate coupled to another pair of adjacent corresponding arms of the upper and lower rods. An elongate crossbeam is extended between the arms of the lower rod. An elongate tubular receiving member is extended between the crossbars of the upper and lower rods. A hitch member is removably inserted through an opening in the back end of the receiving member into the lumen of the receiving member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new motorcycle hitch apparatus and method which has many of the advantages of the hitches for a motorcycle mentioned heretofore and many novel features that result in a new motorcycle hitch which is not anticipated, rendered obvious, suggested, or even implied by any of the prior art hitches for a motorcycle, either alone or in any combination thereof.

It is another object of the present invention to provide a new motorcycle hitch which may be easily and efficiently manufactured and marketed.

It is a further object of the present invention to provide a new motorcycle hitch which is of a durable and reliable construction.

An even further object of the present invention is to provide a new motorcycle hitch which is susceptible of a low cost of manufacture with regard to both materials and labor, and which accordingly is then susceptible of low prices of sale to the consuming public, thereby making such motorcycle hitch economically available to the buying public.

Still yet another object of the present invention is to provide a new motorcycle hitch which provides in the apparatuses and methods of the prior art some of the advantages thereof, while simultaneously overcoming some of the disadvantages normally associated therewith.

Still another object of the present invention is to provide a new motorcycle hitch for attaching a trailer to a motorcycle.

Yet another object of the present invention is to provide a new motorcycle hitch which includes spaced apart upper and lower rods each having a pair of elongate arms and an elongate crossbar extending between the arms. Each arm of the upper rod is positioned adjacent a corresponding arm of the lower rod. The invention includes a pair of mounting plates with one of the mounting plates coupled to one pair of adjacent corresponding arms of the upper and lower rods and another mounting plate coupled to another pair of adjacent corresponding arms of the upper and lower rods. An elongate crossbeam is extended between the arms of the lower rod. An elongate tubular receiving member is extended between the crossbars of the upper and lower rods. A hitch member is removably inserted through an opening in the back end of the receiving member into the lumen of the receiving member.

Still yet another object of the present invention is to provide a new motorcycle hitch that is very clean looking when attached to the back of a motorcycle in that the hitch does not protrude from the back of the motorcycle in an unsightly manner when not in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
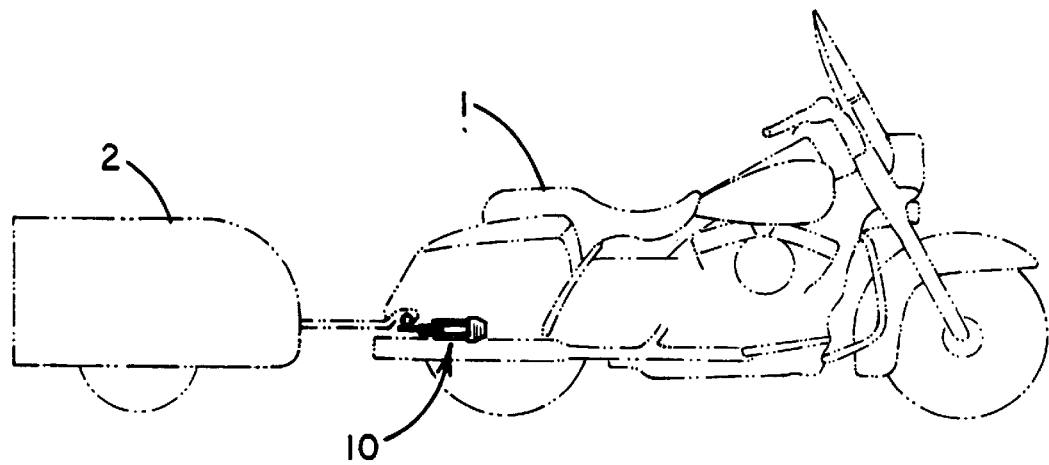
FIG. 1 is a schematic side view of a new motorcycle hitch in use according to the present invention.

With reference now to the drawings, and in particular to FIGS. 1 through 4 thereof, a new motorcycle hitch embodying the principles and concepts of the present invention and generally designated by the reference numeral 10 will be described.

The hitch 10 is designed for mounting to the back of a motorcycle 1 so that a trailer 2 may be attached to the motorcycle 1. As best illustrated in FIGS. 1 through 4, the motorcycle hitch 10 generally comprises spaced apart upper and lower rods 12,16 each having a pair of elongate arms 13,14,17,18 and an elongate crossbar 15,19 extending between the arms. Each arm of the upper rod 12 is positioned adjacent a corresponding arm of the lower rod 16. The invention includes a pair of mounting plates 20,21 with one of the mounting plates 20 coupled to one pair of adjacent corresponding arms 13,17 of the upper and lower rods 12,16, and another mounting plate 21 coupled to another pair of adjacent corresponding arms 14,18 of the upper and lower rods 12,16. An elongate crossbeam 24 is extended between the arms 17,18 of the lower rod 16. An elongate tubular receiving member 30 is extended between the crossbars of the upper and lower rods 12,16. A hitch member 40 is removably inserted through an opening in the back end 32 of the receiving member 30 into the lumen of the receiving member 30.

Figure 2:
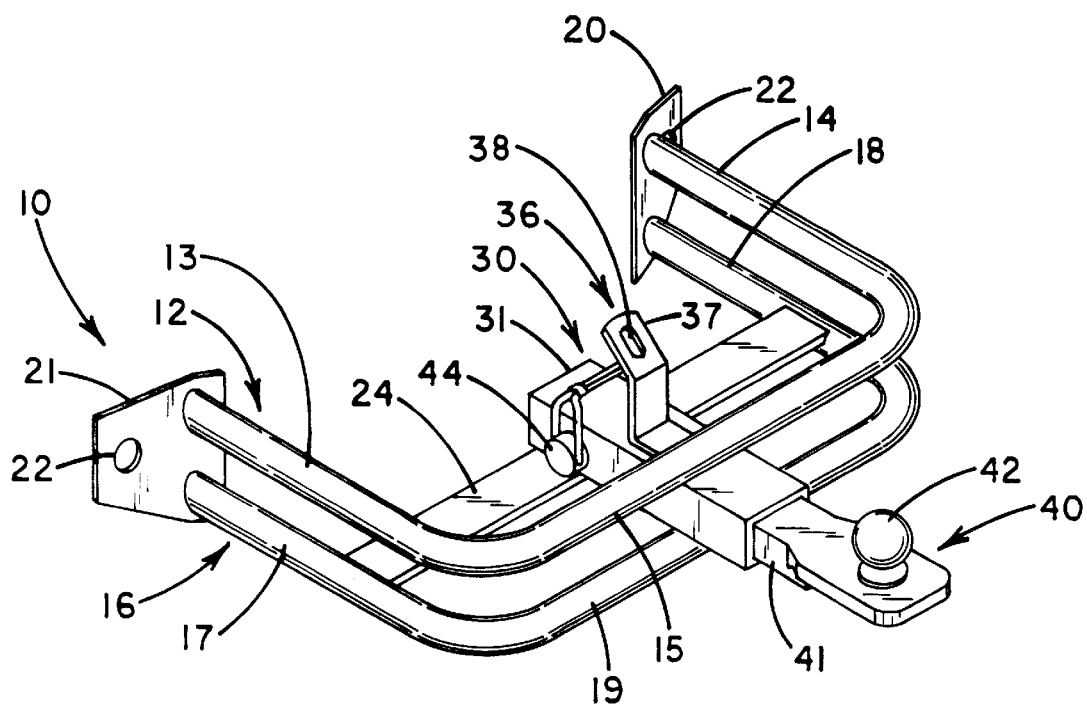
FIG. 2 is a schematic perspective view of the first embodiment of the present invention.
Figure 3:
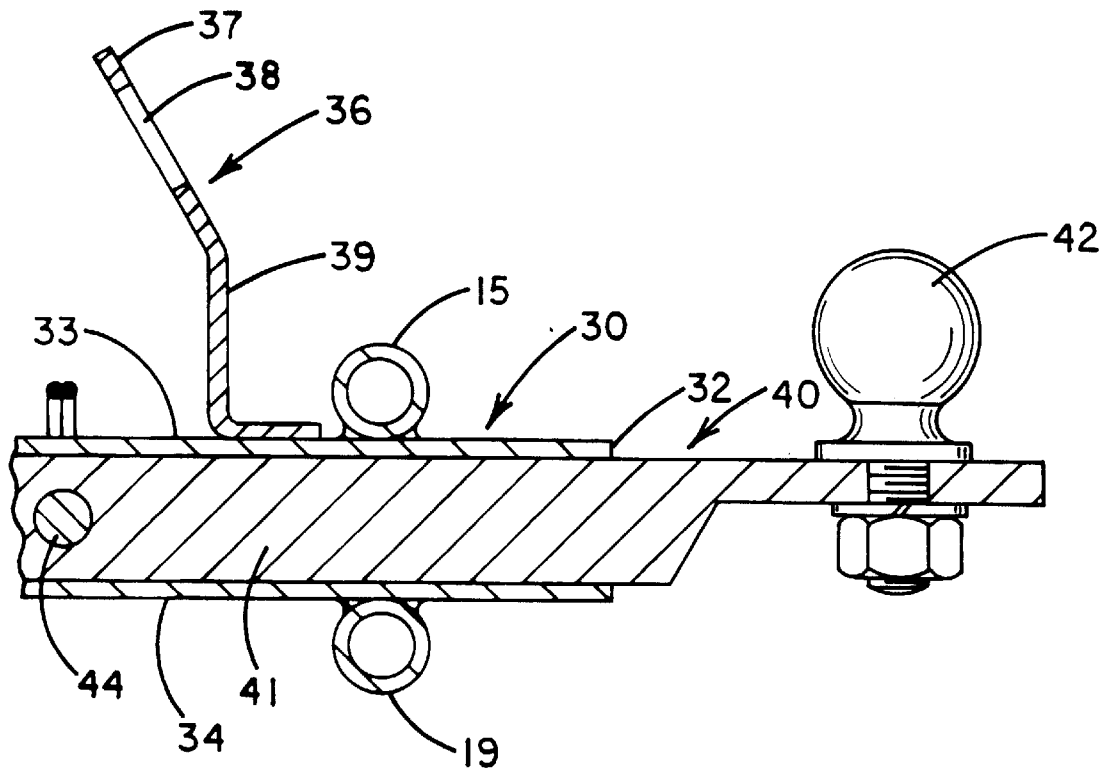
FIG. 3 is a schematic cross sectional view of the hitch member of the first embodiment of the present invention.
Figure 4:
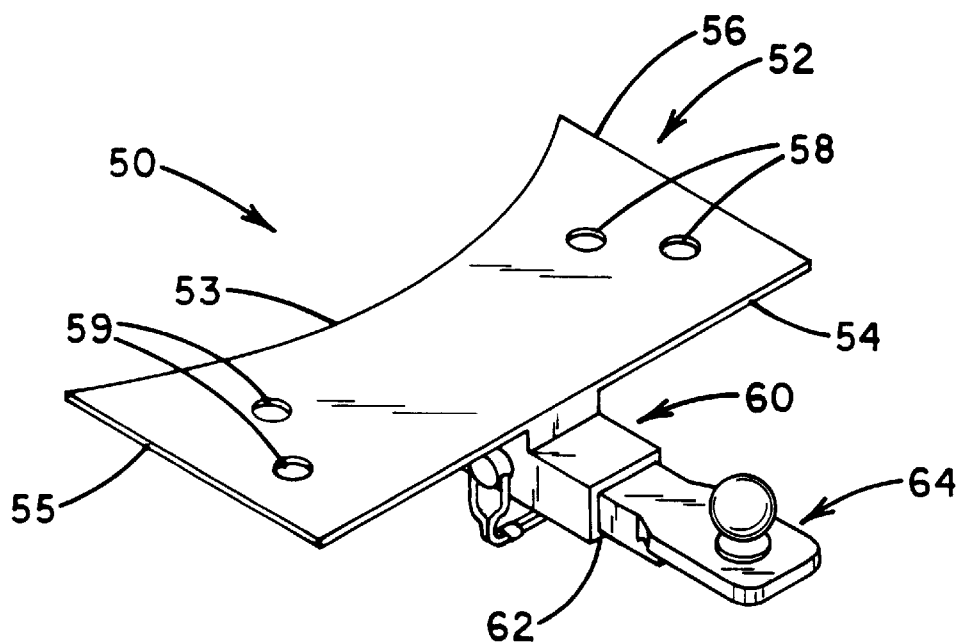
FIG. 4 is a schematic perspective view of the second embodiment of the present invention.

With reference to FIGS. 1–3, the hitch 10 is designed for mounting to the back of a motorcycle, in particular to a Harley-Davidson model motorcycle. Specifically, the hitch 10 includes spaced apart upper and lower rods 12,16 which are generally rectangular U-shape and preferably having a generally circular cross section. Each rod 12,16 has a pair of elongate arms 13,14,17,18 and an elongate crossbar 15,19 extending between their arms 13,14,17,18. The arms 13,14 of the upper rod 12 are positioned adjacent a corresponding arm 17,18 of the lower rod 16. Each of the arms 13,14,17,18 terminates at a terminal end.

The hitch also includes a pair of mounting plates 20,21, with one of the mounting plates 20 is coupled to the terminal ends of one pair of adjacent corresponding arms 14,18 and the other mounting plate coupled to the terminal ends of the other pair of adjacent corresponding arms 13,17. With reference to FIG. 2, each of the mounting plates 20,21 has a mounting hole 22 extending therethrough. The mounting holes 22 are preferably generally circular and are designed for inserting a fastener therethrough to mount the mounting plates 20,21 to a portion of motorcycle as illustrated in FIG. 1.

Preferably, the hitch 10 also includes an elongate crossbeam 24 which is generally rectangular. The crossbeam 24 is extended between the arms 17,18 of the lower rod 16 and positioned such that the crossbeam is spaced apart from the crossbar 19 of the lower rod 16.

The elongate tubular receiving member 30 has a lumen, opposite front and back ends 31,32, and upper and lower surfaces 33,34. Preferably, the receiving member 30 has a generally rectangular cross section such that the lumen of the receiving member 30 also has a generally rectangular cross section. The back end 32 of the receiving member 30 has an opening into the lumen of the receiving member 30 which is also preferably generally rectangular. The receiving member 30 is extended between the crossbars 15,19 of the upper and lower rods 12,16 such that the length of the receiving member 30 is extended substantially perpendicular to the lengths of the crossbars 15,19 of the upper and lower rods 12,16 and such that the front end 31 of the receiving member 30 is extended in the direction towards the terminal ends of the arms of the upper and lower rods 12,16 and the back end 32 of the receiving member 30 is rearwardly extended from the crossbars 15,19.

The lower surface 34 of the receiving member 30 is coupled to the upper surface of the crossbeam 24 towards the second end of the receiving member 30. Also, as illustrated in FIG. 3, the upper surface 33 of the receiving member 30 is coupled to the crossbar 15 of the upper rod 12 while the lower surface 34 of the receiving member 30 is coupled to the crossbar 19 of the lower rod 16.

As best illustrated in FIG. 3, the hitch member 40 includes an elongate base 41 and a ball hitch 42. Preferably, the elongate base 41 has a generally rectangular cross section and is removably inserted through the opening of said back end 32 of the receiving member 30 into the lumen of the receiving member 30. Ideally, a securing pin 44 is removably extended through the receiving member 30 and the hitch member 40 to secure the hitch member 40 to the receiving member 30.

With reference to FIGS. 2 and 3, an elongate mounting arm 36 is extended from the upper surface 33 of the receiving member 30 such that the mounting arm 36 is positioned between the front end 31 of the receiving member 30 and the crossbar 15 of the upper rod 12. The mounting arm 36 is bent to form upper and lower portions 37,39. The lower portion 39 of the mounting arm 36 is upwardly extended generally perpendicular from upper surface of the receiving member 30. The upper portion 37 of the mounting arm 36 is upwardly extended from the upper surface 33 of the receiving member 30 and towards the front end 31 of the receiving member 30. The upper portion 37 of the mounting arm 36 also has a mounting hole 38 extending therethrough. Preferably, the mounting hole 38 is generally oblong and is designed for inserting a fastener therethrough to mount the mounting arm 36 to a portion of motorcycle.

In an alternative embodiment 50, the hitch is designed for mounting to the back of a Kawasaki 1200 model motorcycle. In this embodiment, the receiving member 60 and the hitch member 64 are designed the same as the receiving member 30 and the hitch member 40 of the first embodiment 10 of the invention.

In this embodiment 50, the rods 12, 16 are replaced with a mount plate 52 having a front edge 53, a back edge 54, a pair of lateral edges 55,56. The front edge 53 of the mount plate 52 is arcuate such that the front edge 53 of the mount plate 52 inwardly curves towards the back edge 54 of the mount plate 52. The mount plate 52 has first and second pairs of generally circular holes 58,59 with the first pair of holes 58 positioned towards one of the lateral edges 56 and the second pair of holes 59 positioned towards another lateral edge 55. Each of the holes 58,59 are designed for inserting a fastener therethrough for mounting the mount plate 52 to a motorcycle.

In this embodiment 50, the upper surface of the receiving member 60 is coupled to the lower surface of the mount plate 52 with the back end 62 of the receiving member 60 is extended from the back edge 54 of the mount plate 52 such that the length of the receiving member 60 is extended substantially perpendicular to the length of the back edge 54 of the mount plate 52.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch for mounting to the back of a motorcycle, said hitch comprising:

spaced apart upper and lower rods each having a pair of elongate arms and an elongate crossbar being extended between said arms, each arm of said upper rod being positioned adjacent a corresponding arm of said lower rod, each of said arms of said rods having a terminal end;

a pair of mounting plates, one of said mounting plates being coupled to one pair of adjacent corresponding arms of said upper and lower rods, another of mounting plates being coupled to another pair of adjacent corresponding arms of said upper and lower rods;

each of said mounting plates having a mounting hole extending therethrough, each of said mounting holes of said mounting plates being for inserting a fastener therethrough to mount said mounting plates to a portion of the motorcycle;

an elongate crossbeam being generally rectangular and having opposite ends, and upper and lower surfaces, said crossbeam being extended between said arms of said lower rod, said crossbeam being spaced apart from said crossbar of said lower rod;

an elongate tubular receiving member having a lumen, opposite front and back ends, and upper and lower surfaces, said back end of said receiving member having an opening into said lumen of said receiving member;

said receiving member being extended between said crossbars of said upper and lower rods, said lower surface of said receiving member being coupled to said upper surface of said cross beam towards a back end of said receiving member, said upper surface of said receiving member being coupled to said crossbar of said upper rod, and said lower surface of said receiving member being coupled to said crossbar of said lower rod; and a hitch member having an elongate base and a ball hitch, said elongate base being removably inserted through said opening of said back end of said receiving member into said lumen of said receiving member.

2. The hitch of claim 1, further comprising an elongate mounting arm being extended from said upper surface of said receiving member, said mounting arm being positioned between said front end of said receiving member and said crossbar of said upper rod, said mounting arm having upper and lower portions;

said upper portion of said mounting arm having a mounting hole extending therethrough, said mounting hole of said upper portion of said mounting arm being for inserting a fastener therethrough to mount said mounting arm to a portion of motorcycle.

3. The hitch of claim 2, wherein said lower portion of said mounting arm is upwardly extended generally perpendicular from upper surface of said receiving member, said upper portion of said mounting arm being upwardly extended from said upper surface of said receiving member and towards said front end of said receiving member.

4. The hitch of claim 2, wherein said mounting hole of said upper portion of said mounting arm is generally oblong.

5. The hitch of claim 1, wherein each of said mounting holes of said mounting plates is generally circular.

6. The hitch of claim 1, wherein said receiving member has a generally rectangular cross section such that said lumen of said receiving member has a generally rectangular cross section, wherein said opening of said back end of said receiving member is generally rectangular, and wherein said elongate base of said hitch member has a generally rectangular cross section.

7. The hitch of claim 1, wherein said receiving member is extended between said crossbars of said upper and lower rods such that the length of said receiving member is extended substantially perpendicular to the lengths of said crossbars of said upper and lower rods.

8. The hitch of claim 1, wherein a securing pin is removably extended through said receiving member and said hitch member to secure said hitch member to said receiving member.

9. A hitch for mounting to the back of a motorcycle, said hitch comprising:

spaced apart upper and lower rods each being generally rectangular U-shape, having a generally circular cross section, and each having a pair of elongate arms and an elongate crossbar being extended between said arms, each arm of said upper rod being positioned adjacent a corresponding arm of said lower rod, each of said arms of said rods having a terminal end;

a pair of mounting plates, one of said mounting plates being coupled to one pair of adjacent corresponding arms of said upper and lower rods, another of mounting plate being coupled to another pair of adjacent corresponding arms of said upper and lower rods;

each of said mounting plates having a mounting hole extending therethrough, each of said mounting holes of said mounting plates being generally circular and being for inserting a fastener therethrough to mount said mounting plates to a portion of motorcycle;

an elongate crossbeam being generally rectangular and having opposite ends, and upper and lower surfaces, said crossbeam being extended between said arms of said lower rod, said crossbeam being spaced apart from said crossbar of said lower rod;

an elongate tubular receiving member having a lumen, opposite front and back ends, and upper and lower surfaces, said receiving member having a generally rectangular cross section such that said lumen of said receiving member has a generally rectangular cross section, said back end of said receiving member having an opening into said lumen of said receiving member, wherein said opening of said back end of said receiving member is generally rectangular;

said receiving member being extended between said crossbars of said upper and lower rods such that the length of said receiving member is extended substantially perpendicular to the lengths of said crossbars of said upper and lower rods;

said lower surface of said receiving member being coupled to said upper surface of said cross beam towards a back end of said receiving member, said upper surface of said receiving member being coupled to said crossbar of said upper rod, said lower surface of said receiving member being coupled to said crossbar of said lower rod;

a hitch member having an elongate base and a ball hitch, said elongate base having a generally rectangular cross section and being removably inserted through said opening of said back end of said receiving member into said lumen of said receiving member, wherein a securing pin is removably extended through said receiving member and said hitch member to secure said hitch member to said receiving member;

an elongate mounting arm being extended from said upper surface of said receiving member, said mounting arm being positioned between said front end of said receiving member and said crossbar of said upper rod, said mounting arm having upper and lower portions;

said lower portion of said mounting arm being upwardly extended generally perpendicular from upper surface of said receiving member, said upper portion of said mounting arm being upwardly extended from said upper surface of said receiving member and towards said front end of said receiving member; and said upper portion of said mounting arm having a mounting hole extending therethrough, said mounting hole of said upper portion of said mounting arm being generally oblong and being for inserting a fastener therethrough to mount said mounting arm to a portion of motorcycle.

10. A hitch for mounting to the back of a motorcycle, said hitch comprising:

spaced apart upper and lower rods each having a pair of elongate arms and an elongate crossbar being extended between said arms, each arm of said upper rod being positioned adjacent a corresponding arm of said lower rod, each of said arms of said rods having a terminal end;

a pair of mounting plates, one of said mounting plates being coupled to one pair of adjacent corresponding arms of said upper and lower rods, another of mounting plates being coupled to another pair of adjacent corresponding arms of said upper and lower rods;

each of said mounting plates having a mounting hole extending therethrough, each of said mounting holes of said mounting plates being for inserting a fastener therethrough to mount said mounting plates to a portion of the motorcycle;

an elongate crossbeam being generally rectangular and having opposite ends, and upper and lower surfaces, said crossbeam being extended between said arms of said lower rod, said crossbeam being spaced apart from said crossbar of said lower rod;

an elongate tubular receiving member having a lumen, opposite front and back ends, and upper and lower surfaces, said back end of said receiving member having an opening into said lumen of said receiving member;

said receiving member being extended between said crossbars of said upper and lower rods;

a hitch member having an elongate base and a ball hitch, said elongate base being removably inserted through said opening of said back end of said receiving member into said lumen of said receiving member;

an elongate mounting arm being extended from said upper surface of said receiving member, said mounting arm being positioned between said front end of said receiving member and said crossbar of said upper rod, said mounting arm having upper and lower portions, said lower portion of said mounting arm is upwardly extended generally perpendicular from upper surface of said receiving member, said upper portion of said mounting arm being upwardly extended from said upper surface of said receiving member and towards said front end of said receiving member; and said upper portion of said mounting arm having a mounting hole extending therethrough, said mounting hole of said upper portion of said mounting arm being for inserting a fastener therethrough to mount said mounting arm to a portion of motorcycle.

11. The hitch of claim 10, wherein said mounting hole of said upper portion of said mounting arm is generally oblong.

12. The hitch of claim 10, wherein each of said mounting holes of said mounting plates is generally circular.

13. The hitch of claim 10, wherein said receiving member has a generally rectangular cross section such that said lumen of said receiving member has a generally rectangular cross section, wherein said opening of said back end of said receiving member is generally rectangular, and wherein said elongate base of said hitch member has a generally rectangular cross section.

14. The hitch of claim 10, wherein said receiving member is extended between said crossbars of said upper and lower rods such that the length of said receiving member is extended substantially perpendicular to the lengths of said crossbars of said upper and lower rods.

15. The hitch of claim 10, wherein a securing pin is removably extended through said receiving member and said hitch member to secure said hitch member to said receiving member.

\* \* \* \* \*